United States Patent Office.

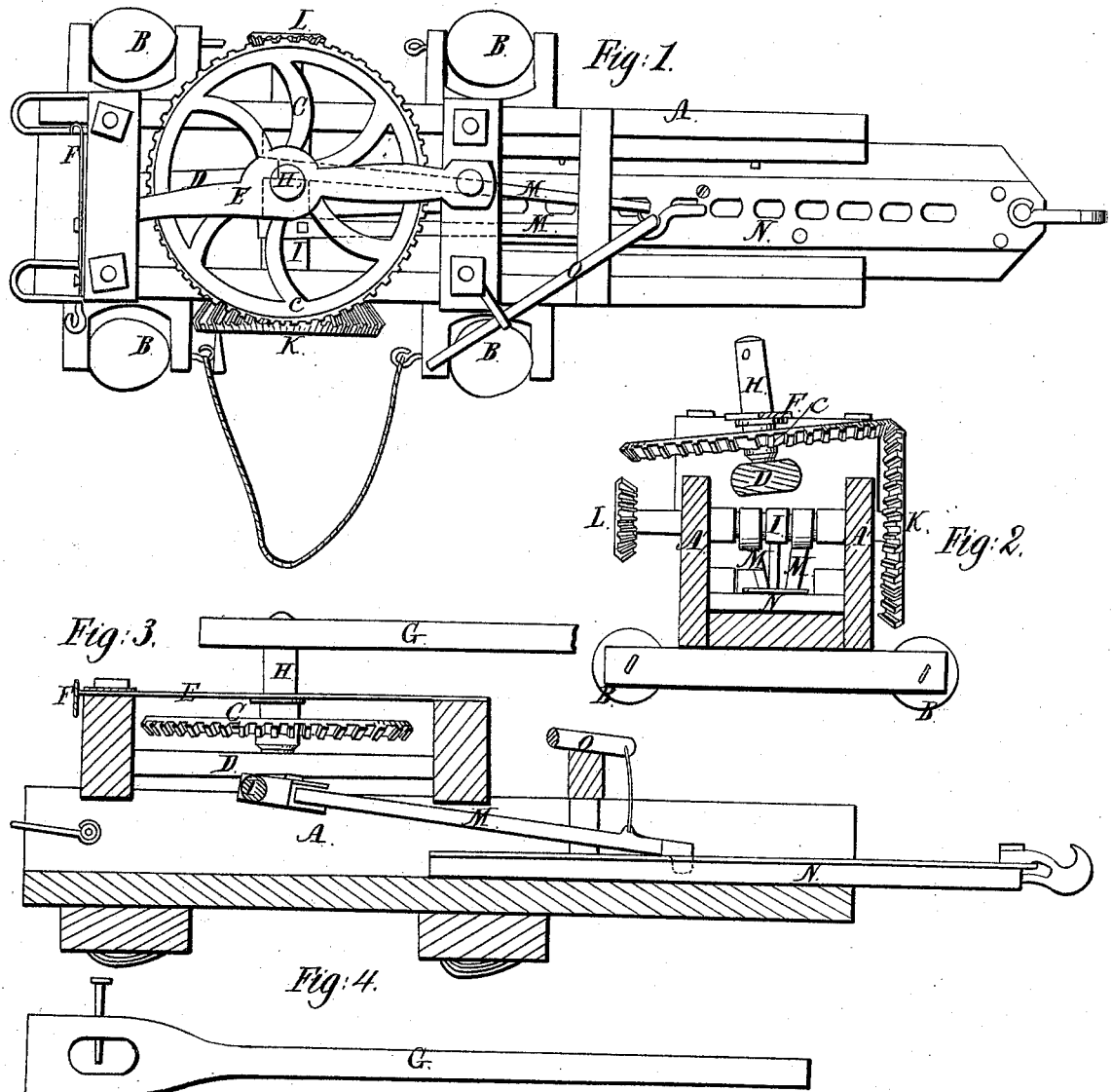

GEORGE W. TOWNSEND, OF GALESBURG, MICHIGAN.

Letters Patent No. 97,461, dated November 30, 1869.

IMPROVEMENT IN STUMP-EXTRACTORS.

The Schedule referred to in these Letters Patent and making part of the same.

*To all whom it may concern:*

Be it known that I, GEORGE W. TOWNSEND, of Galesburg, in the county of Kalamazoo, and in the State of Michigan, have invented new and useful Improvements in Stump-Extractors; and do hereby declare that the following is a full, clear, and exact description thereof, reference being had to the accompanying drawings, and to the letters of reference marked thereon.

My invention is intended as an improvement on the patent granted to me April 30, 1867, for stump-extractor; and consists in the construction and general arrangement of the parts constituting the same.

In order to enable others skilled in the art to which my invention appertains, to make and use the same, I will now proceed to describe its construction and operation, referring to the annexed drawings, which form a part of this specification, and in which—

Figure 1 is a plan view of my extractor.

Figure 2 is an end view of the same, part of the frame being removed.

Figure 3 is a section view of my machine.

Figure 4 is a plan view of the tongue.

Letter A represents the frame of my machine, which may be made of any suitable size and shape, and which rests upon four rollers, B, two upon each side of the frame. By means of these, the frame can be swung around to any desired angle, and serve as runners when the machine has to be drawn endways.

Placed upon the top of the frame is the large driving-wheel C, by means of which the motion is communicated to the other two, for the purpose of operating the two draught-bars.

The lower end of the shaft, upon which this wheel revolves, has its bearings upon a beam or cross-piece, D, which is so hung upon the frame that the wheel can be tilted from one side to the other.

Just above the wheel there is a collar around it, so as to prevent it from being raised upward, and then passes through the lever E, by means of which the wheel C is moved from one side to the other.

One end of this lever is pivoted to a cross-piece on top of the frame, while the other end passes under a guide, and then has its end passed through an opening in the spring F, so as to retain it in place.

To the upper end of this shaft is attached the draught-bar G, to which is attached the horses or other motive-power.

This bar has an opening or slot cut in its end large enough to pass over the top of the shaft H, and then has a pin or bolt passed through.

By bolting this bar on in this manner, it can be raised up and down, so as to suit any variance in the ground.

The horses, in drawing this bar, may either pass all around the frame or go only part of the way, and then reverse the motion.

Passing through the frame there is a double-cranked axle, I, which has a small wheel on one end, and a large one on the other.

When it is desired to impart power to the two bars which exert the power upon the stump, the wheel C is tilted over by means of the lever E, so as to gear with the large wheel K, but when rapidity more than power is wanted, it is tilted over so as to gear with the small one L.

Secured to each one of the cranks on the axle I, there is a long draught-bar, M, both of which have their ends formed like a hook, so as to catch in the openings in the slide N.

One of the rods is longer than the other, so that as the cranks move them back and forward, the longer one catches in one of the openings, and draws it back far enough to enable the shorter one to catch in a second, and then, while the shorter one is drawing back, the longer one again goes forward and catches in another notch.

In the bottom of the frame is placed the slide N, which is held down in its place by guides or bars, and which has a metal hook attached to its end, so that it can be attached to the stump. Along the top of this slide there is a perforated metal plate, which prevents the edges of the holes in the wood from being worn, and to which the hook is pivoted.

In order to raise the bars M up, so as to prevent them from catching in the slide, a lever, O, attached by ropes or chains to the ends of them, is pivoted to the side of the frame.

Having thus described my invention,

What I claim, and desire to secure by Letters Patent, is—

1. Placing the frame upon the rollers B, when arranged in the manner and for the purpose specified.

2. The double-crank axle I, when provided with a large and a small wheel, K and L, substantially as and for the purpose specified.

3. The manner of placing the wheel C upon the bar D, so that it can be tilted from one side to the other, substantially as set forth.

4. The wheel C, in combination with the lever E and spring F, when used in the manner specified.

5. The manner of attaching draught-rod G to the axle H, in the manner and for the purpose specified.

6. In combination with the double-crank axle I, the two bars M and lever O, when used substantially as specified.

7. The arrangement and combination of the wheels C, K, and L, lever E, crank-axle I, bars M, slide N, and spring F, when all are used to form a machine in the manner and for the purpose described.

In testimony that I claim the foregoing, I have hereunto set my hand, this 25th day of March, 1869.

GEORGE W. TOWNSEND.

Witnesses:
C. W. COCK,
JNO. L. COCK.